(12) United States Patent
Suzuki et al.

(10) Patent No.: US 9,188,674 B2
(45) Date of Patent: Nov. 17, 2015

(54) LASER RADAR DEVICE

(71) Applicants: Shuichi Suzuki, Kanagawa (JP); Mitsuru Nakajima, Kanagawa (JP); Kenichi Yoshimura, Kanagawa (JP); Shigeaki Imai, Kanagawa (JP); Tadashi Nakamura, Tokyo (JP); Hiroyoshi Funato, Kanagawa (JP)

(72) Inventors: Shuichi Suzuki, Kanagawa (JP); Mitsuru Nakajima, Kanagawa (JP); Kenichi Yoshimura, Kanagawa (JP); Shigeaki Imai, Kanagawa (JP); Tadashi Nakamura, Tokyo (JP); Hiroyoshi Funato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/930,030

(22) Filed: Jun. 28, 2013

(65) Prior Publication Data
US 2014/0009747 A1 Jan. 9, 2014

(30) Foreign Application Priority Data

Jul. 3, 2012 (JP) .................................. 2012-149648
Nov. 29, 2012 (JP) .................................. 2012-261644

(51) Int. Cl.
*G01C 3/08* (2006.01)
*G01S 17/02* (2006.01)
*G01S 7/481* (2006.01)

(52) U.S. Cl.
CPC ............... *G01S 17/02* (2013.01); *G01S 7/4817* (2013.01)

(58) Field of Classification Search
CPC ........ G01C 3/08; G01C 15/002; G01S 17/89; G01S 7/4817; G01S 17/42
USPC .................. 356/3.01, 4.01, 5.01, 5.09, 9, 625
See application file for complete search history.

(56) References Cited

U.S. PATENT DOCUMENTS

| 4,583,853 A | * | 4/1986 | Maeda et al. .................. 356/323 |
| 5,353,262 A | * | 10/1994 | Yakymyshyn et al. ........ 367/149 |
| 5,438,449 A | * | 8/1995 | Chabot et al. .............. 359/216.1 |
| 5,793,491 A | * | 8/1998 | Wangler et al. ............... 356/613 |
| 5,864,391 A | | 1/1999 | Hosokawa et al. |

(Continued)

FOREIGN PATENT DOCUMENTS

| EP | 1965225 A2 | 9/2008 |
| JP | 09-274076 | 10/1997 |

(Continued)

OTHER PUBLICATIONS

U.S. Appl. No. 13/771,465, filed Feb. 20, 2013.

(Continued)

*Primary Examiner* — Luke Ratcliffe
*Assistant Examiner* — Samantha K Abraham
(74) *Attorney, Agent, or Firm* — Cooper & Dunham LLP

(57) ABSTRACT

Disclosed is a laser radar device including a modulated light beam generator that emits light beams to a target, a photodetector that receives reflected light; a reflected light condenser that condenses the reflected light; a rotator that rotates around a rotation axis; and mirrors included in the rotator that scan the light beams, and guide the reflected light to the reflected light condenser, wherein an angular detection range in a vertical direction is divided into a plurality of layers, wherein mirror surfaces of the mirrors are tilted by corresponding tilt angles relative to the rotation axis, the tilt angles being different from each other, wherein the modulated light beam generator emits the light beams in the vertical direction, the light beams having different emission angles, and wherein a difference between the emission angles corresponds to the angular detection range of one layer in the vertical direction.

11 Claims, 29 Drawing Sheets

(56) References Cited

U.S. PATENT DOCUMENTS

| | | | |
|---|---|---|---|
| 6,473,714 B1* | 10/2002 | Kumagai et al. | 702/150 |
| 6,956,686 B2* | 10/2005 | Koreeda | 359/207.2 |
| 7,527,207 B2* | 5/2009 | Acosta et al. | 235/462.31 |
| 8,575,537 B2* | 11/2013 | Yao et al. | 250/221 |
| 2007/0285649 A1* | 12/2007 | Nakamura | 356/4.07 |
| 2010/0165082 A1* | 7/2010 | Kiehn et al. | 348/46 |
| 2010/0245955 A1* | 9/2010 | Yamakawa et al. | 359/31 |
| 2010/0266313 A1* | 10/2010 | Nakajima | 399/151 |
| 2010/0302528 A1* | 12/2010 | Hall | 356/5.01 |
| 2013/0077083 A1 | 3/2013 | Suzuki et al. | |
| 2013/0120734 A1 | 5/2013 | Ogata et al. | |

FOREIGN PATENT DOCUMENTS

| | | |
|---|---|---|
| JP | 2010-066101 | 3/2010 |
| JP | 2011-203122 | 10/2011 |
| JP | 2011-203156 | 10/2011 |
| WO | WO98/16801 | 4/1998 |

OTHER PUBLICATIONS

European Search Report dated Oct. 29, 2014 in corresponding European patent application No. 13 17 3839.5.

\* cited by examiner

LASER RADAR DEVICE

BACKGROUND OF THE INVENTION

1. Field of the Invention

The present invention relates to a laser radar device.

2. Description of the Related Art

In order to find a vehicle ahead or an obstacle on a track, or to detect a white line, which is used as a lane marking on a road, or a road stud such as a cat's-eye, in general, an object type determination device is used which employs a scanning laser radar. A laser radar device emits a laser beam ahead of a vehicle, and receives reflected light, thereby detecting an obstacle or the like ahead of the vehicle.

A generic laser radar device includes a photoemitter that generates a pulsed laser light beam, and that scans the light beam in a horizontal direction; a photodetector such as a photodiode that receives the laser light which is reflected by the object in front of the vehicle, and that converts it into a voltage signal; and an optical receiver including an optical element such as a lens that guides the reflected light toward the photodetector. A distance between the vehicle and the object can be calculated by a time difference between a moment at which the pulsed laser is generated and a moment at which the reflected light is received by the photodetector.

Usually, a pulsed laser light is generated by applying a pulse-shaped driving current to a semiconductor laser diode, and the pulsed laser light is guided to an optical scanner that scans light in the horizontal direction through optical coupling element such as a coupling lens. For example, a polygon mirror or a galvanometer mirror has been used as the optical scanner. By scanning a laser beam by a mirror device, distance measurement can be performed across a wide range in the horizontal direction.

In addition to expansion of the range of the measurement in the horizontal direction, recently, there is a need for two-dimensional scanning, in which a beam is also scanned in a vertical direction, and there is a need for multi-line scanning (multi-layered), in which a measured area in the vertical direction is divided and a light beam is horizontally scanned.

As a means for achieving the two-dimensional scanning or the multi-line scanning, in general, a configuration can be considered in which scanning devices, scanning directions of which are different by 90 degrees, are connected in series, and beam scanning in the horizontal direction is performed and subsequently the beam scanning in the vertical direction is performed. As a means for more easily achieving the multi-line scanning, a method can be considered in which a tilt angle is defined for each of reflection planes of a rotational polygon mirror relative to a rotation axis of the rotational polygon mirror such that the tilt angles of the corresponding reflection planes are different from each other. Additionally, as a means for enabling the multi-line scanning in which measured areas are different in the vertical direction, a configuration may be adopted in which more than one of photodetectors are arranged in the vertical direction.

As described above, for a laser radar device which scans a laser beam, a method has already been known in which, in addition to scanning in the horizontal direction, measurement is performed by dividing a detection area in the vertical direction.

Unfortunately, with a laser radar device according to related art, as a number of layers in the vertical direction increases, the cost is significantly increased and/or the size of the device is significantly increased.

For example, when the configuration is adopted in which the plural photodetectors are arranged in the vertical direction, it may be required to prepare the photodetectors so that a number of light receiving areas of the photodetectors is equal to a number of layers of the detection area, which is divided in the vertical direction. For a laser radar device for a medium to long distance which is greater than several tens of meters, in general, an avalanche photodiode (APD), which has a high detection sensitivity, is used as the photodetector. However, an APD element is expensive. When the number of the light receiving areas is increased, the number of the APDs to be used is also increased, thereby increasing the cost. In addition, for the divided detection areas, it may be required to individually prepare detection signal processing systems, such as an amplifier circuit, and control is complicated. This can also be a cause of an increase in the cost.

When the detection area in the vertical direction is divided by making the tilt angles of the mirrors included in the polygon mirror relative to the rotation axis to be different from each other, it may be required that a number of the mirror surfaces is greater than or equal to a number of the layers in the vertical direction. Thus, the size of the polygon mirror is enlarged. A problem is that it can be a cause of an increase in size of the whole device.

Patent Document 1 (Japanese Unexamined Patent Publication No. H09-274076) discloses a configuration of a laser radar device which scans a laser beam. In the configuration, beam scanning is performed by a polygon mirror, which includes mirror surfaces whose tilt angles relative to a rotation axis of the polygon mirror are different from each other, so as to divide a detection area in the vertical direction into multiple layers.

The invention disclosed in Patent Document 1 includes a configuration such that the multiple areas, which are divided in the vertical direction by the polygon mirror having the mirror surfaces with the different tilt angles, are scanned by a beam. However, with the invention disclosed in Patent Document 1, when the number of the layers in the vertical direction is increased, it may be required to prepare the number of the mirror surfaces which is greater than or equal to the number of the layers. Thus, the invention disclosed in Patent Document 1 may not solve the problem in which the size of the device may be enlarged.

SUMMARY OF THE INVENTION

An object of the present invention is to provide a laser radar device which performs multi-layer scanning such that a measurement angular range in the vertical direction is divided into multiple ranges. Here, even if a number of the divided ranges in the vertical direction is increased, the laser radar device remains less expensive and small in size.

According to one aspect of the present invention, there is provided a laser radar device including a modulated light beam generator configured to emit light beams to a detection target, the modulated light beam generator including a light source and a coupling lens;

a photodetector configured to receive reflected light which is reflected by the detection target, when the light beams emitted by the modulated light beam generator irradiate the detection target;

a reflected light condenser configured to condense the reflected light and configured to guide the reflected light to the photodetector;

a rotator configured to rotate around a rotation axis; and mirrors configured to scan the light beams in a horizontal direction, and configured to guide the reflected light to the reflected light condenser, the mirrors being included in the rotator;

wherein an angular detection range in a vertical direction relative to a direction in which the light beams are emitted is divided into a plurality of layers, wherein the mirrors include corresponding mirror surfaces, wherein the mirror surfaces are tilted by corresponding tilt angles relative to the rotation axis, the tilt angles being different from each other, wherein the modulated light beam generator emits two or more light beams in the vertical direction, the two or more light beams having different emission angles, and wherein a difference between the emission angles corresponds to the angular detection range of one layer in the vertical direction.

According to another aspect of the present invention, there is provided a laser radar device including a modulated light beam generator configured to emit light beams to a detection target, the modulated light beam generator including a light source and a coupling lens;

a photodetector configured to receive reflected light which is reflected by the detection target, when the light beams emitted by the modulated light beam generator irradiate the detection target;

a reflected light condenser configured to condense the reflected light and configured to guide the reflected light to the photodetector;

a rotator configured to rotate around a rotation axis; and mirrors configured to scan the light beams in a horizontal direction, and configured to guide the reflected light to the reflected light condenser, the mirrors being included in the rotator, wherein a difference between the emission angle in the horizontal direction of the light beams corresponding to a center direction of the scanning by one of the mirrors and an incident angle of the corresponding light beams entering from the modulated light beam generator to the one of the mirrors is less than 90 degrees.

According to another aspect of the present invention, there is provided a laser radar device including a modulated light beam generator configured to emit light beams to a detection target, the modulated light beam generator including a light source and a coupling lens;

a photodetector configured to receive reflected light which is reflected by the detection target, when the light beams emitted by the modulated light beam generator irradiate the detection target;

a reflected light condenser configured to condense the reflected light and configured to guide the reflected light to the photodetector;

a rotator configured to rotate around a rotation axis; and mirrors configured to scan the light beams in a horizontal direction, and configured to guide the reflected light to the reflected light condenser, the mirrors being included in the rotator, wherein the rotation axis of the rotator is tilted from the vertical direction.

With regard to a laser radar device that is capable of multi-layer scanning such that a measurement angle range in the vertical direction is divided into a plural areas, even if a division number of dividing the area in the vertical direction is increased, it is possible to provide a compact laser radar device with a low cost.

Other objects, features and advantages of the present invention will become more apparent from the following detailed description when read in conjunction with the accompanying drawings.

DETAILED DESCRIPTION OF THE PREFERRED EMBODIMENTS

Figure 1:
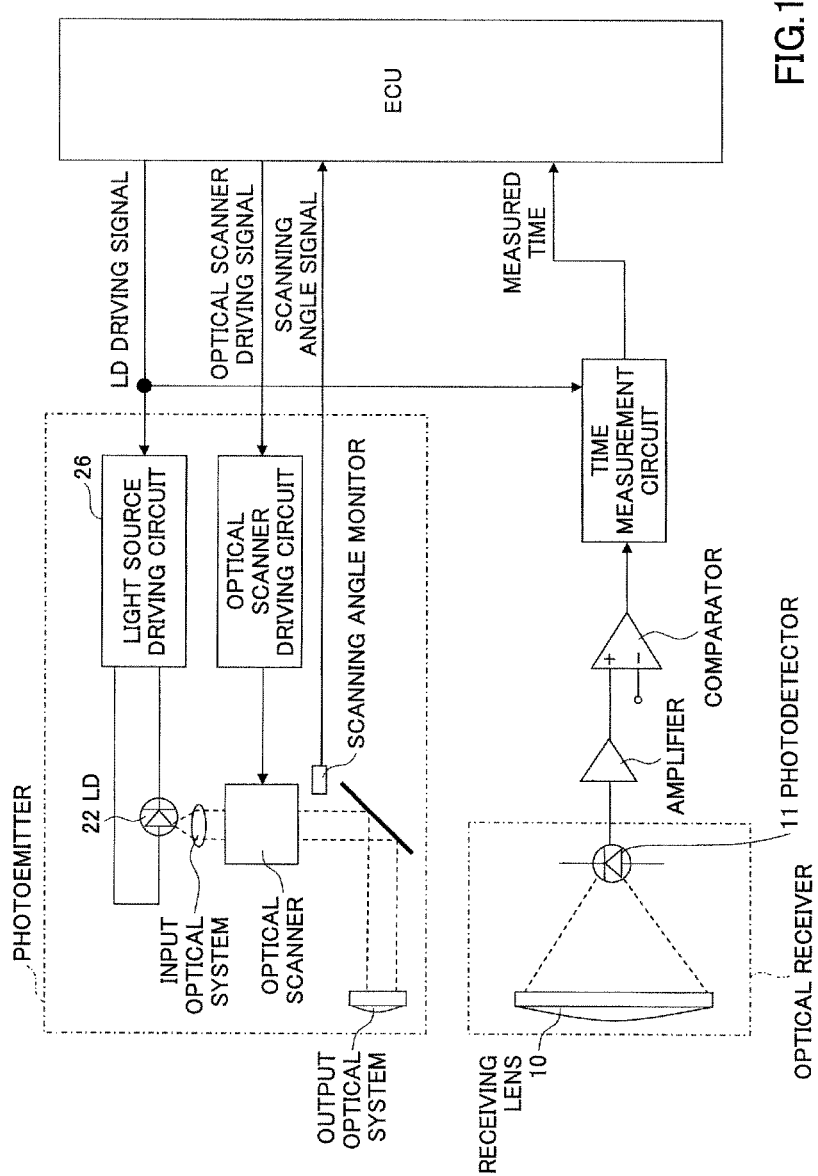
FIG. 1 shows a configuration of a scanning laser radar device which is capable of performing multi-layer operations.
Figure 2:
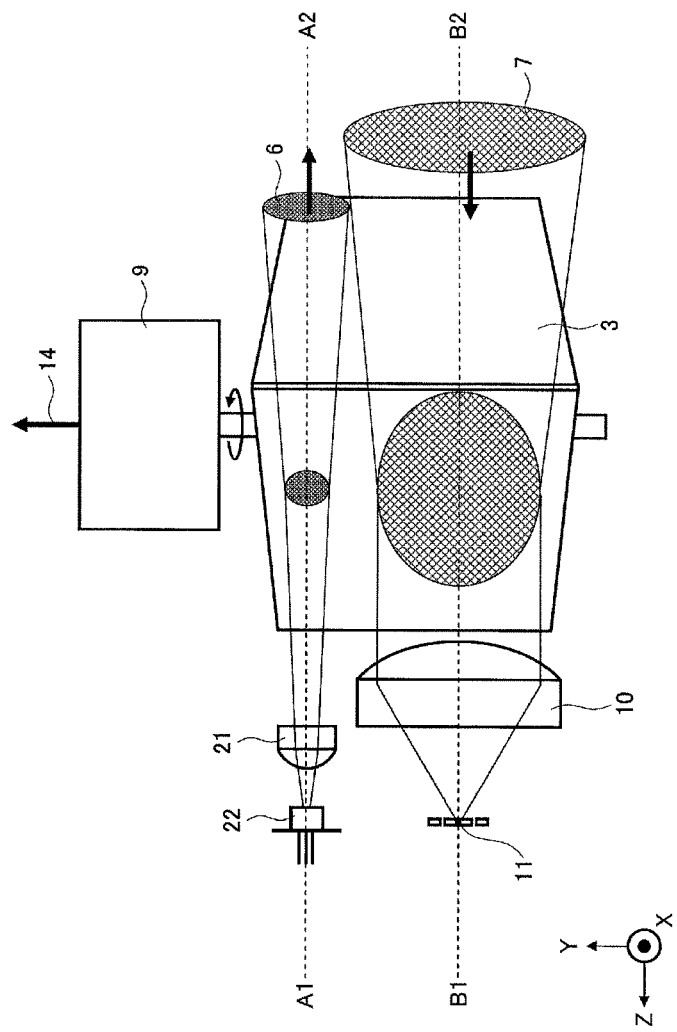
FIG. 2 shows the scanning laser radar device which is capable of performing the multi-layer operations.
Figure 3:
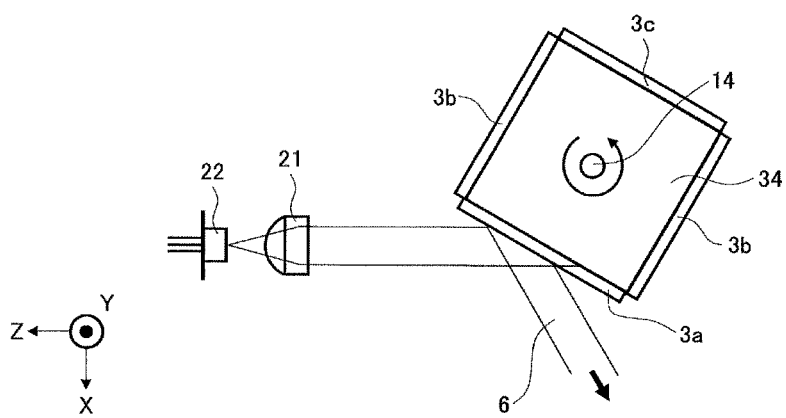
FIG. 3 shows a cross-sectional view taken along a line A1A2 of the configuration of the scanning laser radar device of FIG. 2 which is capable of performing the multi-layer operations.
Figure 4:
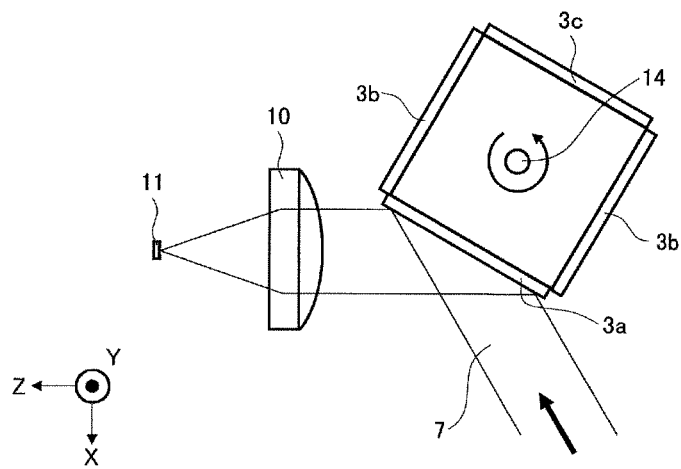
FIG. 4 shows a cross-sectional view taken along a line B1B2 of the configuration of the scanning laser radar device of FIG. 2 which is capable of performing the multi-layer operations.

FIG. 1 is a diagram illustrating a configuration of a scanning laser radar device that is capable of performing multi-layer operations. FIG. 2 shows the scanning laser radar device that is capable of performing the multi-layer operations. FIG. 3 is a diagram showing the configuration of the laser radar device on an XZ surface which includes a line A1A2. FIG. 4 is a diagram showing the configuration of the laser radar device on the XZ surface which includes a line B1B2.

A light beam 13 emitted from a light source 22 is guided to a polygon mirror through a coupling lens 21 in a direction which is in parallel with a Z-axis. The polygon mirror 3 is rotated by a motor 9. The motor 9 has a rotation axis 14 which is in parallel with a Y-axis. As shown in FIG. 3, a light beam 13 scans an XZ plane in accordance with rotation of the polygon mirror 3. The light beam 13 emitted from the laser radar device is reflected by the detection target. The light beam 13 is guided to a photodetector 11 through receiving mirrors 3a, 3b, 3c, and 3d, and a receiving lens 10. Then, the light beam 13 is detected as a reflected signal 7.

The light reflected by the detection target is reflected at a reflecting point in random directions. However, as shown in FIG. 4, only a light component which is reflected along an optical path which is the same as that of the light beam emitted from the laser radar device enters the polygon mirror 3 again. Namely, the beam which is emitted by the laser radar device and the reflected light are reflected by the same mirror among the mirrors 3a, 3b, 3c, and 3d which are included in the polygon mirror 3. Further, rotational speed of the mirrors is very slow relative to the speed of light. A rotation angle of the polygon mirror 3 which corresponds to a time difference between a moment at which the emitted beam is reflected by one of the mirror surfaces 3a, 3b, 3c, and 3d and a moment at which the reflected light is reflected by the one of the mirror surfaces 3a, 3b, 3c, and 3d is so small that it can be negligible.

The reflected signal 7 is reflected by the polygon mirror 3 as a receiving mirror. The reflected signal 7 is a light beam that always travels in a direction which is perpendicular to the Y-axis, regardless of the rotation angle. After that, the light beam is condensed by the receiving lens 10 onto the photodetector 11. In this manner, by performing optical scanning and reception of the reflected light by rotating the scanning mirror and the receiving mirror by the common rotation axis 14, it is possible to perform distance measurement corresponding to a predetermined angular range in a horizontal direction (on an XZ-plane).

A light beam irradiation angular range in the vertical direction is defined by a beam flare angle in the vertical direction of the light beam 6 which is emitted from the laser radar device. The beam flare angle in the vertical direction depends on light emission width of the light source 22 and a focal length of the coupling lens 21. Accordingly, by controlling values of the light emission width of the light source 22 and the focal length of the coupling lens 21, the light beam having a predetermined flare angle in the vertical direction is emitted from the laser radar device. Since the reflected signal 7 from the detection target returns the receiving mirror 3 by traveling the optical path which is the same as that of the emitted light beam 6, the reflected signal 7 which is coupled with the receiving lens 10 through the receiving mirror 3 also has a flare angle in the vertical direction which is the same as the flare angle of the emitted light beam. Thus, the reflected signal 7 which passes through the receiving lens 10 is condensed at a position which is shifted in the Y-axis direction from the center of the optical axis on a plane on which the photodetector 11 is arranged, depending on an angular component of the reflected signal 7.

As shown in FIG. 2, by arranging a plurality of photodetectors 11 in a line in the vertical direction (the Y-axis direction) and detecting reflected signals by the corresponding photodetectors 11, measurement can be made in which the vertical direction is divided into a number of ranges. Here, the number of the ranges is the number of the photodetectors 11. By controlling a detection width in the Y-axis direction of the whole photodetectors 11 and a focal length of the receiving lens, the angular detection range in the vertical direction is determined. By matching the determined angular detection range with the light beam irradiation angular range, and by detecting the reflected signals 7 by dividing the photodetector 11 into a plurality of detection areas in the Y-axis direction, multi-layer operations in the vertical direction are enabled.

Further, as a method of making a multi-layered detection range in the vertical direction, a method is considered in which tilt angles of the mirrors included in the polygon mirror 3 with respect to the rotation axis 14 of the motor 9 are set to be different from each other. By providing predetermined tilt angles to the mirrors of the polygon mirror 3, an emission angle in the vertical direction of the emitted light beam 13 is controlled, and each time the mirror surface by which the light beam 6 is reflected is changed, a vertical output angle is changed. The reflected signal 7 is guided to the photodetector 11 through the receiving lens 10 by the reflection on the mirror surface, which is the same as the mirror surface which reflects the light beam 6. Since the beam irradiation range and the light detection area are defined by the tilt angle of the mirror, the detection range in the vertical direction can be multi-layered without increasing the number of the photodetectors 11.

Figure 5:
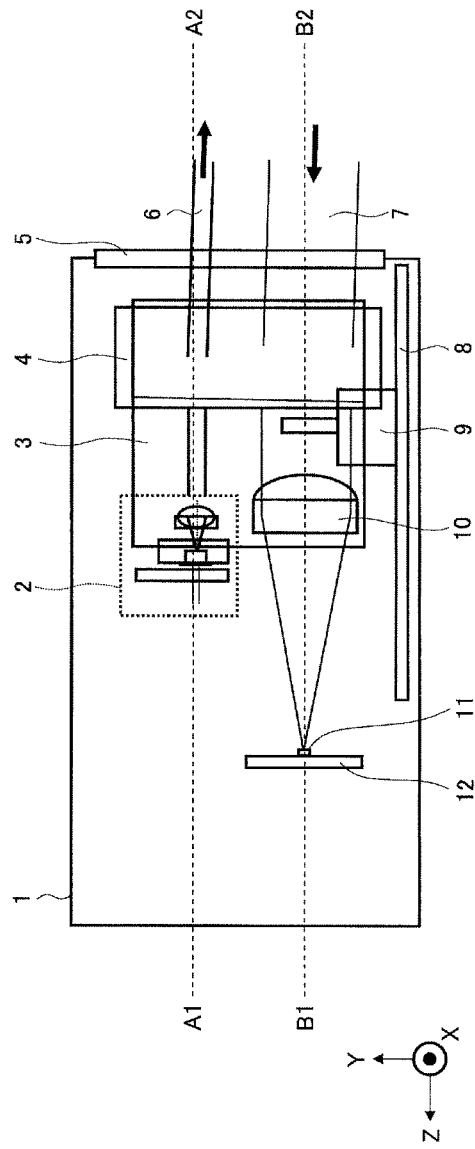
FIG. 5 shows a basic configuration of a laser radar device according to an embodiment.
Figure 6:
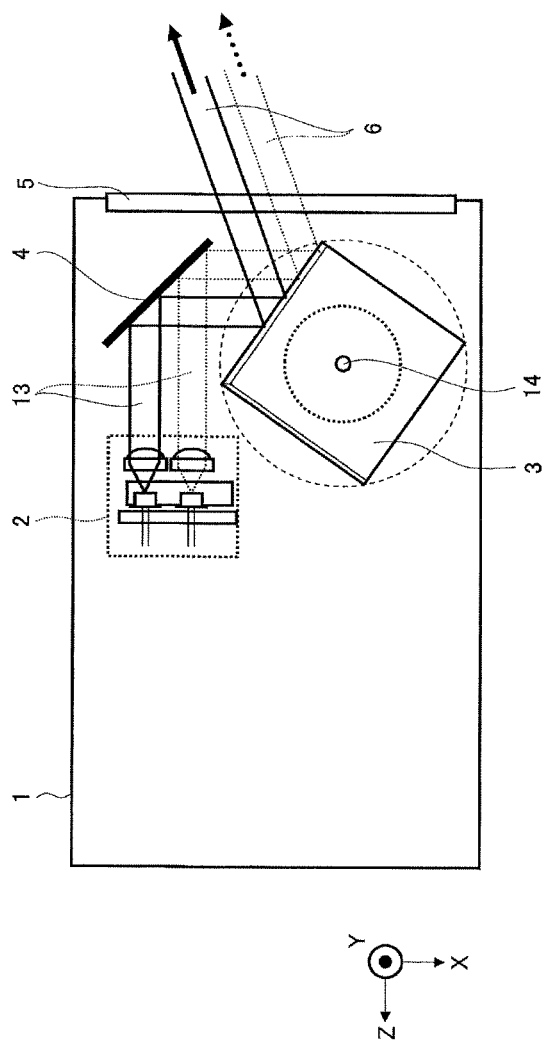
FIG. 6 shows the basic configuration of the laser radar device according to the embodiment.
Figure 7:
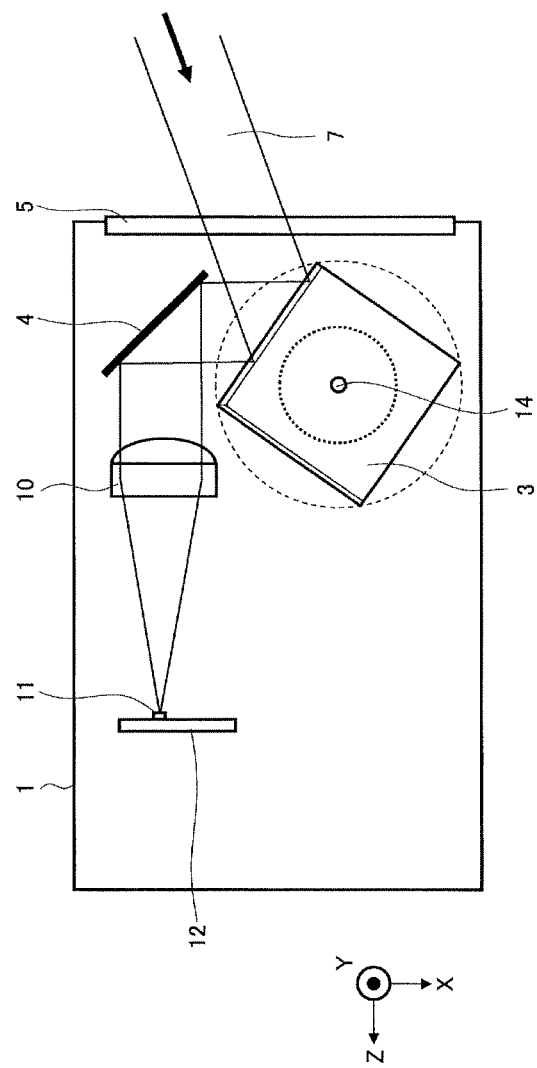
FIG. 7 shows the basic configuration of the laser radar device according to the embodiment.
Figure 8:
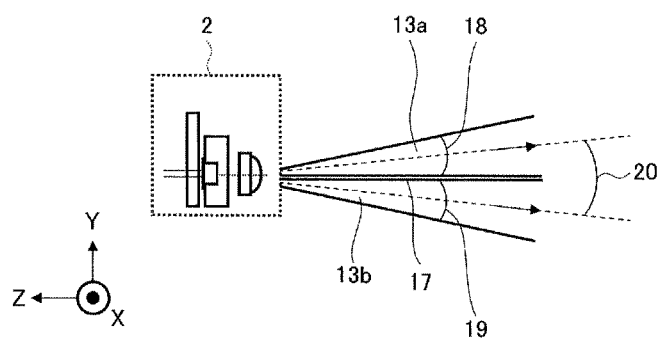
FIG. 8 shows a light beam generator of the laser radar device according to the embodiment.

FIGS. 5 through 8 are diagrams illustrating a basic configuration of the laser radar according to the embodiment. FIG. 5 is a diagram showing a configuration of the laser radar, when the laser radar is viewed from a side. FIG. 7 is a diagram showing the configuration of the laser radar in the XZ-plane including a line A1A2 of FIG. 5. FIG. 8 is a diagram showing the configuration of the laser radar in the XZ-plane including a line B1B2 of FIG. 5.

FIG. 6 depicts the light beam 6 which is emitted from the laser radar device through the polygon mirror 3. The light beam 13 which is emitted from a light beam generator 2 is almost parallel light. The light beam 13 is guided to one surface where the mirror surface, which is included in the polygon mirror 3 and which is tilted by the predetermined tilt angle, is arranged through a corner mirror 4. Then, the laser beam is emitted outside the laser radar device while forming a horizontal output angle in accordance with the rotation angle of the polygon mirror 3.

As for a temporal waveform of the light beam, a pulse signal waveform is used in many cases such that emission of light in a very short time period (several nanoseconds to several hundred nanoseconds) is repeated at every predetermined time period. However, an amplitude modulated beam may be used which is generated by providing a sinusoidal amplitude modulation or a triangular amplitude modulation to the light source.

FIG. 7 depicts a path of a light beam when the reflected signal 7 is guided to the photodetector 11 through the polygon mirror 3 and the receiving lens 10. The reflected signal 7 is light which is scattered by an object which is several meters to several hundred meters away from the laser radar device.

Thus, the reflected signal 7 which is returned to the laser radar device may be deemed to be parallel light. The reflected signal 7 is coupled with the receiving lens through the polygon mirror 3 and the corner mirror 4, and the reflected signal 7 is eventually guided to the photodetector 11, which is implemented on a photodetector driving circuit.

The polygon mirror 3 is attached to the motor 9 having the rotation axis 14. The polygon mirror 3 keeps rotating at a predetermined speed. The mirrors included in the polygon mirror 3 are tilted by the corresponding tilt angles relative to the rotation axis 14 of the motor 9. The tilt angles are different from each other. The tilt angles are suitably adjusted depending on the detection range in the vertical direction.

FIG. 8 schematically depicts the light beams 13a and 13b, which are emitted from the light beam generator 2 according to the embodiment. In FIG. 8, the light beam generator 2 according to the embodiment is explained by using an example of the light beam generator 2 which emits two light beams 13a and 13b. The light beams 13a and 13b have corresponding predetermined flare angles 18 and 19 in the vertical direction. A value of the flare angle 18 of the light beam 13a is set to be the value which is almost equal to the angular detection range for one layer in the vertical direction. Similarly, a value of the flare angle 19 of the light beam 13b is set to be the value which is almost equal to the angular detection range for one layer in the vertical direction. An output angle of the light beam 13a is different from an output angle of the light beam 13b. A difference 20 between the output angles is set to be an angle which is almost equal to a detection angle of one layer in the vertical direction. Namely, the flare angle and the output angle of each of the light beams are defined such that horizontal beam scanning corresponding to one layer in the vertical direction is covered by the one light beam.

Figure 9:
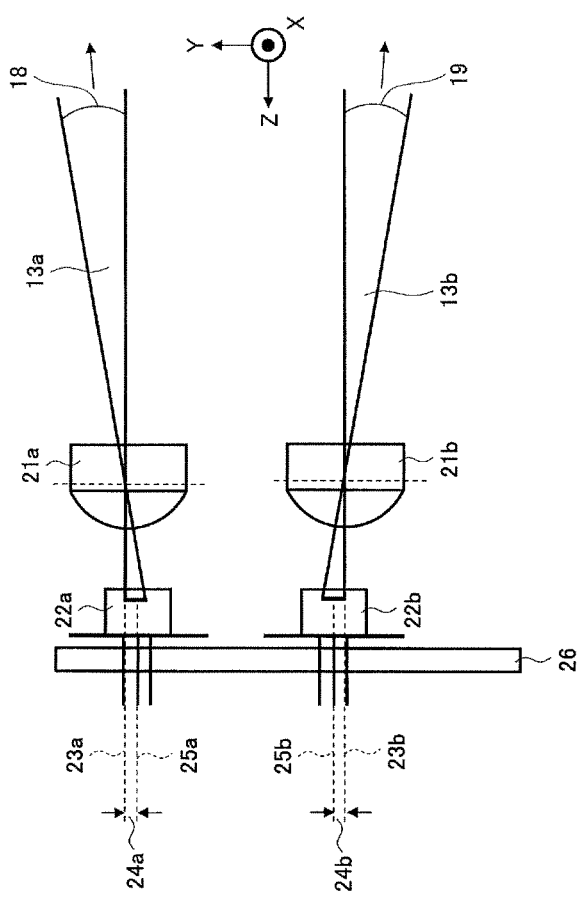
FIG. 9 shows an example of an arrangement of the light beam generators, each of which is depicted in FIG. 8.

FIG. 9 is a diagram illustrating an example of a configuration of a light beam generator that generates a plurality of light beams. Here, the light beams are output while their output angles are forming a predetermined angle in the vertical direction as shown in FIG. 8. The light beam generator 2 includes light sources 22a and 22b, and coupling lenses 21a and 22b. The number of the light sources 22a and 22b and the number of the coupling lenses 21a and 21b are equal to the number of the light beams. Light emission timing of the light sources 22a and 22b can be individually controlled. The light beam 13a is emitted by causing the light source 22a to emit the light by applying a predetermined modulation pattern by using the light source driving circuit. Then, the light beam 13a having the predetermined flare angle 18 is output by passing through the coupling lens 21a. Similarly, the light beam 13b is emitted by causing the light source 22b to emit the light by applying a predetermined modulation pattern by using the light source driving circuit. Then, the light beam 13b having the predetermined flare angle 19 is output by passing through the coupling lens 21b. The beam flare angle $\Delta\theta$ can be controlled by a light emission width W of the light source and the focal length f of the coupling lens. The beam flare angle $\Delta\theta$ is determined by the following formula.

$$\Delta\theta \approx \tan^{-1}\left(\frac{W}{f}\right)[\text{rad}] \quad (1)$$

Further, an offset is provided between an optical axis 25a of the light source 22a and an optical axis 23a of the coupling lens 21a. Similarly, an offset is provided between an optical axis 25b of the light source 22b and an optical axis 23b of the coupling lens 21b. The output angle of the light beams 13a and 13b can be controlled by the offset amount. The output angle $\theta$ of the light beams 13a and 13b can be controlled by the offset amount $\Delta W$ and the focal length f of the coupling lenses 21a and 21b. The output angle $\delta$ of the light beams 13a and 13b is determined by the following formula.

$$\theta \approx \tan^{-1}\left(\frac{\Delta W}{f}\right)[\text{rad}] \quad (2)$$

Thus, by controlling the light emission widths of the light sources 22a and 22b, the focal lengths of the coupling lenses 21a and 21b, and the offset amount of the optical axes of the light source and the coupling lens, a light beam having a desired beam flare angle and a desired output angle can be provided.

For example, as shown in FIG. 8, when the number of output beams is two, the two light sources 22a and 22b and the two coupling lenses 21a and 21b having the same performance can be used. The light sources 22a and 22b and the coupling lenses 21a and 21b are installed such that the optical axis offset amounts coincide and directions of the offsets 24a and 24b of the corresponding beams are opposite to each other. In this manner, designing can be made, so that the light beam 13a and the light beam 13b have the same beam flare angles in the vertical direction, and the difference between the output angles in the vertical direction of the corresponding beams 13a and 13b is equal to the detection angle, which corresponds to one layer in the vertical direction.

At this time, a relationship between the beam flare angle and the beam output angle is $\Delta\theta=0.5\times\theta$, and the offset amount is given by the following expression:

$$\Delta W \cong 2W \quad (3)$$

As specific examples of numerical values, when the angular detection range in the vertical direction of the laser radar device is 1.0 degree, the light emission width of the light sources 22a and 22b may be set to be 200 µm; the light emission width in the vertical direction and the offset amount of the light sources 22a and 22b may be set to be 100 µm; and the focal length of the coupling lenses 21a and 21b may be set to be 11.5 mm, as a design example of the light beam generator 2 which is suitable for the laser radar device. In this case, the beam flare angles of the light beams 13a and 13b are 1.0 degree, and the difference between the output angles of the corresponding light beams 13a and 13b is 1.0 degree.

Figure 10:
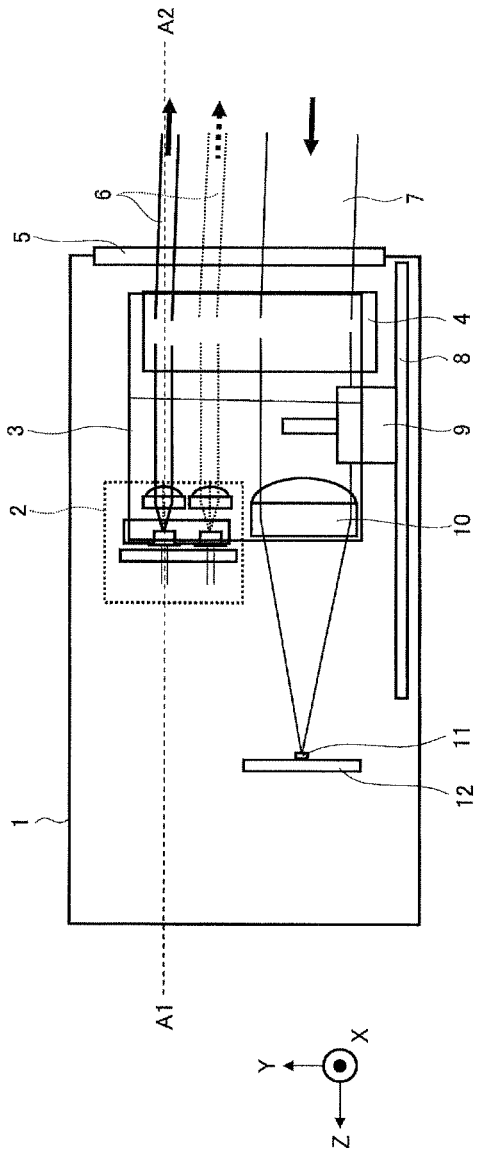
FIG. 10 shows one example of a laser radar device.
Figure 11:
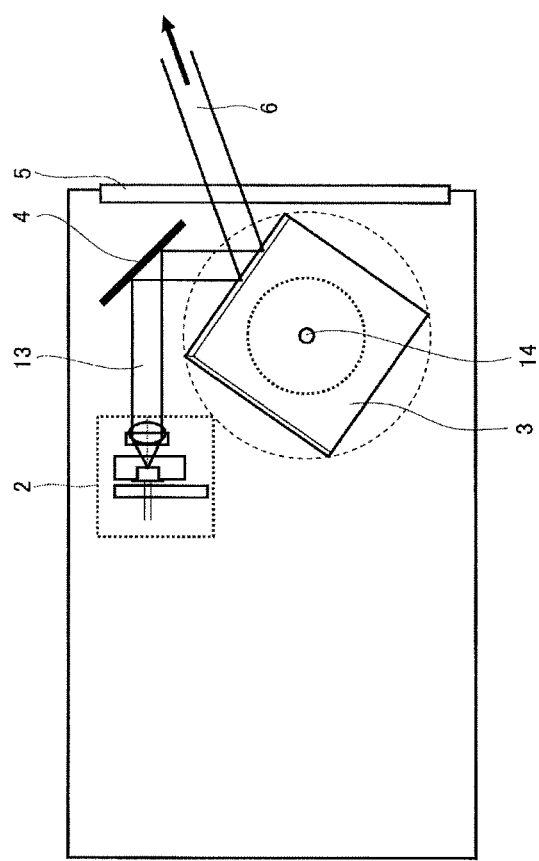
FIG. 11 illustrates a cross-sectional view taken along a line A1A2 of the laser radar device of FIG. 10.

The configuration of the light beam generator 2 is not limited to the case where the output angles in the vertical direction of the light beams are different from each other. The above-described configuration utilizes the offset between the laser light source and the coupling lens. However, for example, a difference between output angles, which corresponds to one layer in the vertical direction, may be provided by a configuration where installation angles of the light sources are different from each other. Further, in the configuration depicted in FIG. 5, two light beams are arranged in the horizontal direction (the X-axis direction). However, as shown in FIG. 10, the light beams may be arranged in the vertical direction (the Y-axis direction). FIG. 11 depicts a configuration of the laser radar device in the XZ-plane including the line A1A2 of FIG. 10. By arranging two light beams in parallel in the vertical direction, the two light beams enter the polygon mirror 3 through almost the same paths in the horizontal direction. Consequently, increase in the areas of the mirrors included in the polygon mirror 3 can be prevented, and increase in size of the polygon mirror 3 can be suppressed.

EXAMPLE 1

Figure 12:
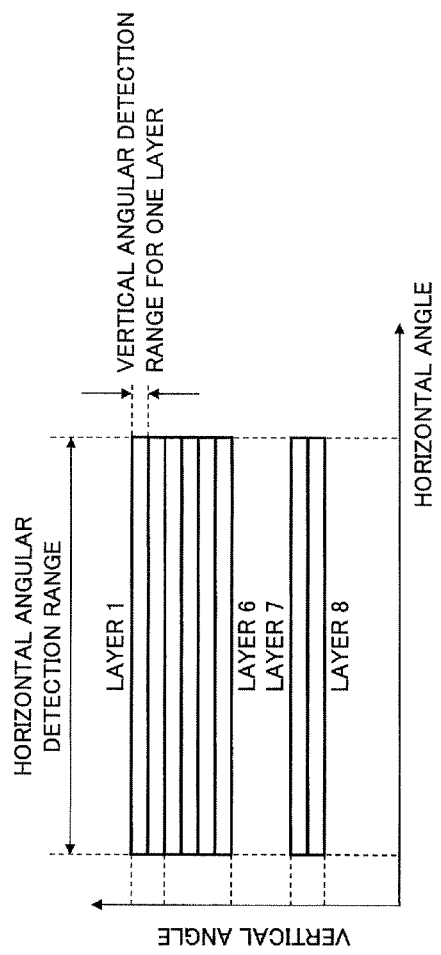
FIG. 12 depicts an example of a target detection range.

FIG. 12 illustrates an example of a target detection range. The horizontal axis represents a detection angle in the horizontal direction, and the vertical axis represents a detection angle in the vertical direction. In the horizontal direction, the distance measurement may be performed in a wide angular range by scanning the light beam by the rotation of the polygon mirror 3. Typically, the detection angle in the horizontal direction is from minus 20 degrees to plus 20 degrees. Further, the detection range in the vertical direction is divided into eight layers. The angular detection range corresponding to one layer is the same for all the eight layers. A typical detection angle in the vertical direction for one layer is approximately 1 degree.

Here, the scanning layers in the vertical direction are denoted by Layer 1, Layer 2, . . . , and Layer 8, from the top. In the example of FIG. 12, Layer 1 through Layer 6 are arranged in the vertical direction without any space between neighboring layers. Layer 7 and Layer 8 are arranged in the vertical direction without any space between them. A predetermined non-detection range is provided between Layer 6 and Layer 7. The upper six layers are used for detecting, for example, a vehicle or a pedestrian ahead. The lower two layers are used for detecting, for example, a white line on a road surface or a road shoulder.

The detection range such as shown in FIG. 12 can be achieved by the two light beams having corresponding different output angles such as shown in FIG. 8, and the polygon mirror having four mirror surfaces such that the tilt angles of the four mirror surfaces are different from each other. The operation of the laser radar device at this time is explained by using FIG. 13. Here, between the two light beams, the light beam which is emitted upward is denoted by the light beam 13a, and the light beam which is emitted downward is denoted by the light beam 13b. Further, the four mirror surfaces included in the polygon mirror 3 are successively denoted by the mirror surface 3a, the mirror surface 3b, the mirror surface 3c, and the mirror surface 3d.

If a time period which is required for scanning the whole detection area, namely, the eight layers is defined to be a detection period, the polygon mirror 3 is rotated two rounds (720 degrees) during the detection period. During the first round, only the light beam 13a is pulse-emitted at a constant frequency. During the second round, only the light beam 13b is pulse-emitted at the constant frequency. Namely, emission timing of the light beam 13a and that of the light beam 13b are different from each other. Further, a pulse irradiation time period is limited to be within a time interval in which the light beam is projected within the angular detection range in the horizontal direction by the polygon mirror 3. However, pulse irradiation may be exceptionally performed during the time interval in which the light beam is projected outside the angular detection range in the horizontal direction, for rotational control of the polygon mirror 3.

First, in accordance with the rotation of the polygon mirror 3, the light beam 13a is scanned by the mirror surface 3a, and the area corresponding to Layer 1 is detected. Subsequently, the layer to be detected is switched by the mirror surface 3b. The tilt angle of the mirror surface 3b is set, so that the area to be scanned is shifted to a lower layer by an amount corresponding to two layers compared to the scanning area by the mirror surface 3a. With such a setting, the area corresponding to Layer 3 is detected by the scanning by the light beam 13a and the mirror surface 3b. Similarly, Layer 5 is detected by the light beam 13a and the mirror surface 3c, and Layer 7 is detected by the light beam 13a and the mirror surface 3d. The first round of the polygon mirror 3 is completed.

Subsequently, the second round rotation starts. At this time, the irradiated light beam is switched from the light beam 13a to light beam 13b. Since the light beam 13b is emitted downward by an amount of one layer compared to the light beam 13a, when the mirror surfaces which scan the light beam 13b are changed, Layer 2, Layer 4, Layer 6, and Layer 8 are sequentially detected. As described above, all the eight layers are detected within a predetermined time period, which is the detection period.

In a configuration of a laser radar device according to related art, since multi-layer operations are achieved only by controlling tilt angles of a polygon mirror, a number of required mirror surfaces is the same as a number of layers. Thus, in order to achieve the detection of the eight layers similar to this example, eight mirror surfaces may be required to be included in the polygon mirror. The configuration of the laser radar device according to the related art improves detection sensitivity by preventing ambient light from being guided to a photodetector by limiting a receiving range of reflected light by scanning by the polygon mirror. However, in order to obtain a sufficient light receiving amount, an area corresponding to one surface of the mirror may not be reduced. Thus, increase in the number of the mirror surfaces is directly linked to increase in size of the polygon mirror. Consequently, the laser radar device is increased in size, and the cost for components is increased.

In contrast, according to the embodiment, since multiple light beams are utilized, even if the number of the layers in the vertical direction is increased, the number of the mirror surfaces of the polygon mirror 3 is not increased. Thus, it is possible to prevent the increase in the size of the laser radar device. Further, since the emission timings of the multiple light beams are different from each other, even if there is only one range of the photodetector, the detection signals of the multiple light beams are not interfered with each other. Accordingly, even if the number of the detection layers is increased, the number of the ranges of the photodetector is not increased. Thus, the laser radar device remains to be less expensive.

EXAMPLE 2

Figure 13:
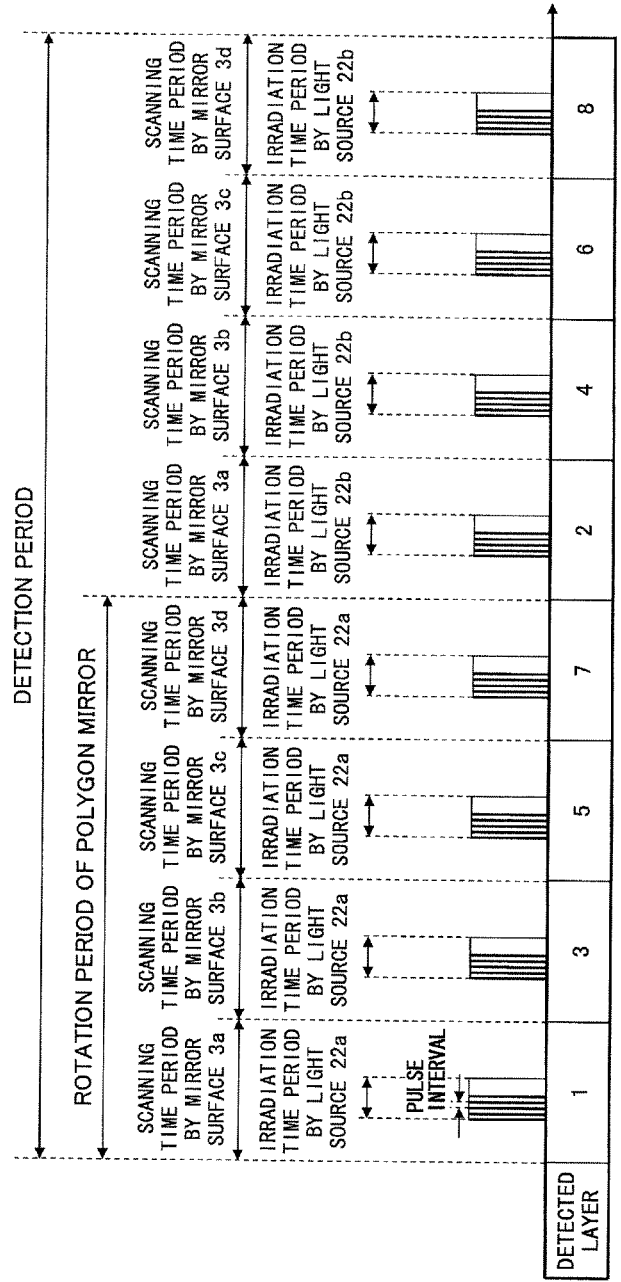
FIG. 13 represents relationships between light emission timing of light sources and scanning time periods of mirrors.
Figure 14:
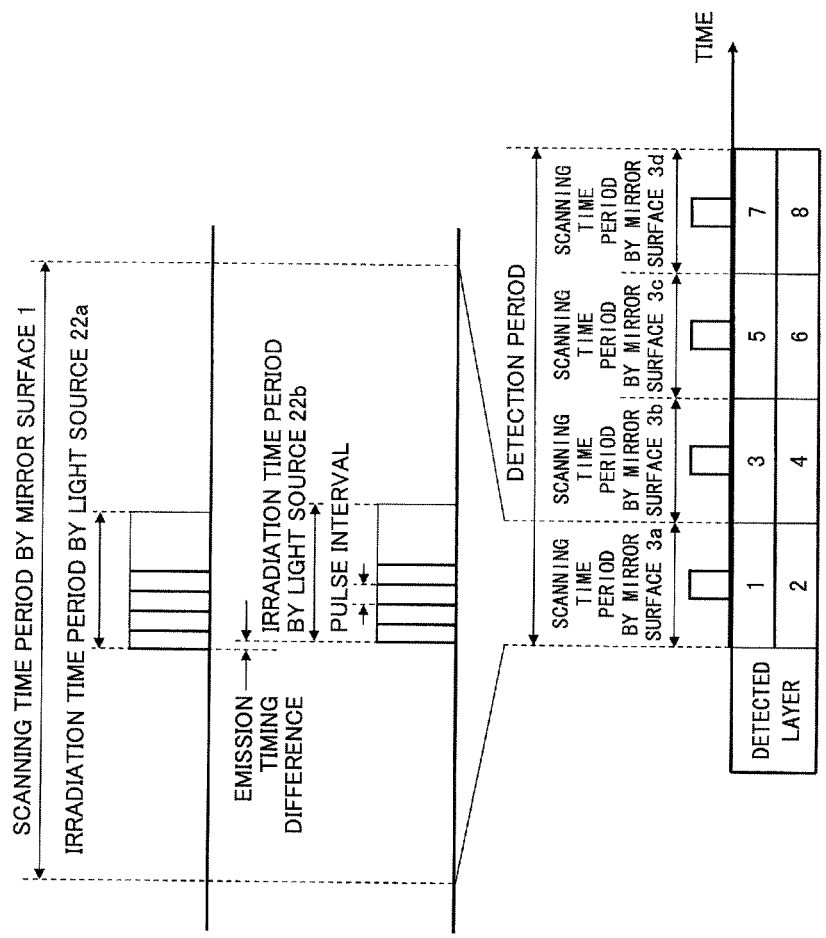
FIG. 14 shows a detail the relationships between the light emission timing of the light sources and the scanning time periods of the mirrors of FIG. 13.

FIG. 14 is a diagram illustrating another example of the emission timing of the light beams. In the example of FIG. 13, the polygon mirror 3 is rotated two rounds in the detection period. In the other example of FIG. 14, the time period for the polygon mirror 3 to be rotated one round coincides with the detection period. The method of FIG. 14 is the same as that of FIG. 13 in a point that the emission timing of the light beam 13a and the emission timing of the light beam 13b are made different from each other. However, the method of FIG. 14 is different from that of FIG. 13 in a point that the two light beams are alternately emitted.

The polygon mirror 3 rotates, and first the light beam 13a and the light beam 13b are scanned by the mirror surface 3a. Here, a predetermined emission time difference is provided between the emission timing of the light beam 13a and the emission timing of the light beam 13b. Namely, by the scanning by the mirror surface 3a, Layer 1 and Layer 2 are detected almost simultaneously. Similarly, Layer 3 and Layer 4 are almost simultaneously detected by the mirror surface 3b, Layer 5 and Layer 6 are almost simultaneously detected by the mirror surface 3c, and Layer 7 and Layer 8 are almost simultaneously detected by the mirror surface 4. Therefore, all the eight layers are detected while the polygon mirror 3 rotates one round.

According to the method of FIG. 14, the rotational speed of the polygonal mirror 3 may be a half of that of the method of FIG. 13. Thus, the rotational control becomes easier, and reliability in long-time driving can be improved.

Here, it is preferable that the time difference between the emission timing of the light beam 13a and the emission timing of the light beam 13b is greater than or equal to 3 microseconds. The reason is that if the time difference between the emission timings is too small, and if the light which is caused by the light beam 1 when the light beam 13a is reflected by an object in a distant place and the light which is caused by the light beam 13b when the light beam 13b is reflected in the vicinity of the laser radar device are mixed, the mixed signals may not be separated.

For the laser radar device, when a difference between the time at which the light pulse is emitted and the time at which the reflected light is detected is denoted by Δt, the distance L between the laser radar device and the detection target is given by L=Δt×c÷2. Here, c is the speed of light. By the above formula, when the Δt is 3 microseconds, L is 450 m. For a vehicle-mounted laser radar device, the maximum distance to be detected is approximately 200 m. Thus, if the reflected light is returned from a place which is located 450 m ahead of the laser radar device, the intensity of the reflected light is sufficiently small, and the reflected light beams caused by multiple light beams are prevented from interfering with each other.

Further, for a usual laser radar device, an emission frequency of the laser pulse is set to be within a range from 10 kHz to 100 kHz. When the emission frequency is converted into the emission period, it is within a range from 10 microseconds to 100 microseconds. Accordingly, it is preferable to set the emission timing difference of the light beams to be less than or equal to 10 microseconds.

EXAMPLE 3

In the embodiment, the multiple light beams are utilized. In an optical system included in the laser radar device according to the embodiment, it is preferable to arrange the light beams to be as close to each other as possible. For example, as shown in FIG. 6, when the two light beams are arranged in parallel in the horizontal direction, it may be required that each of the mirror surfaces of the polygon mirror 3 has a sufficient width to reflect both the light beams. Thus, when the space between the light beams is wide, the area of the mirror becomes large, and it can be a cause of increase in size of the device.

Figure 15:
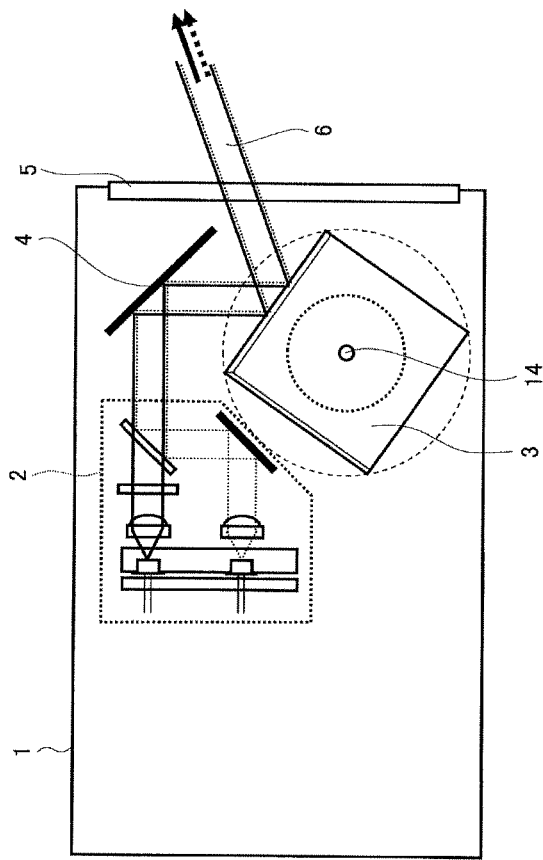
FIG. 15 shows a top view of the laser radar device according to one example.

When the number of the light beams is to be increased while the light beams are arranged to be as close to each other as possible, it is effective to perform beam synthesis. FIG. 15 shows a situation in which the projected beam is propagating, when the two light beams are synthesized to be within a region of almost one light beam by the beam synthesis. Further, FIG. 16 shows a specific example of a configuration of the light beam generator of FIG. 15.

Figure 16:
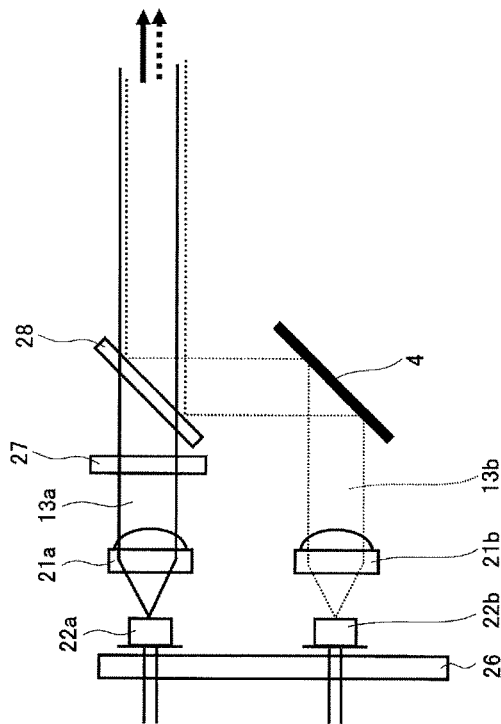
FIG. 16 shows a specific configuration example of a light beam generator according to FIG. 15.

As an example, a method of achieving the beam synthesis is explained by referring to FIG. 16. Here, a case is considered in which the number of the light beams is two. The light beam generator 2 includes two light sources 22a and 22b which are implemented on a light source driving circuit 26; the two coupling lenses 21a and 21b; a half-wave plate 27; a polarization beam splitter (PBS) 28; and the corner mirror 4 that changes a traveling direction of the one of the light beams. In FIG. 16, the light sources 22a and 22b are implemented on the common light source driving circuit 26. However, emission control of the light sources 22a and 22b may be performed by corresponding individual driving circuits. Further, with regard to the optical axis of the light source and the optical axis of the coupling lens, since the offset is provided in the Y-axis direction, the output angles in the vertical direction of the light beams 13a and 13b are different from each other.

The light beams 13a and 13b which are almost in parallel are generated by the corresponding light sources 22a and 22b, and the coupling lenses 21a and 21b. A polarization direction of the light source 22a coincides with a polarization direction of the light source 22b. Here, it is assumed that the electric fields oscillate in the Y-axis direction. As for the light beam 13a, when the light beam 13a passes through the half-wave plate 27, the polarization direction of the light beam 13a is rotated by 90 degrees, and the light beam 13a becomes a polarized light such that the electric field oscillates in the X-axis direction. As for the light beam 13b, the polarization direction of the light source 22b is maintained as it is, and the electric field oscillates in the Y-axis direction. When the light beams 13a and 13b enter the PBS 28, due to the difference in the polarization directions, the light beam 13a passes through the PBS 28, whereas the light beam 13b is reflected by the PBS 28. Consequently, the light beam 13a and the light beam 13b are synthesized, so that they become a single light beam on the XZ-plane.

The polarization directions of the two beams after the beam synthesis are different by 90 degrees. It is possible that, due to the difference in the polarization directions, the detection sensitivity of the laser radar device with respect to the projected light beam 13a is different from the detection sensitivity of the laser radar device with respect to the projected light beam 13b. In such a case, it is effective to make the synthesized two beams pass through a quarter-wave plate. After the synthesized two beams pass through the quarter-wave plate, the synthesized two beams become circularly polarized light. Consequently, the dependency of the detection sensitivity of the laser radar device on the polarization may be resolved.

By performing the above-described beam synthesis, even if the number of the light beams is increased, the light beams are output to outside the laser radar device through almost the same path. Consequently, increase in size of the optical system can be suppressed. A case can be considered in which it is difficult to arrange the light sources or the coupling lenses to be close to each other, so as to improve the heat dissipation characteristic of the laser diodes, or to adjust the positions of the coupling lens precisely. In such a case, by performing the beam synthesis, a region where the light beams propagate can be narrowed down to be a region for almost one beam. Consequently, increase in size of the optical system is avoided, and the layout of the optical system can be flexibly designed.

EXAMPLE 4

Figure 17:
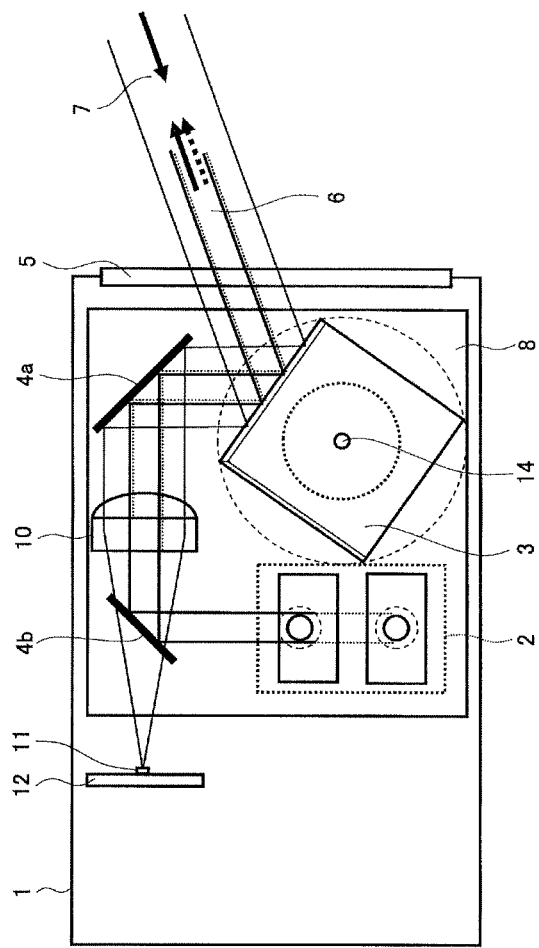
FIG. 17 shows a top view of the laser radar device according to one example.
Figure 18:
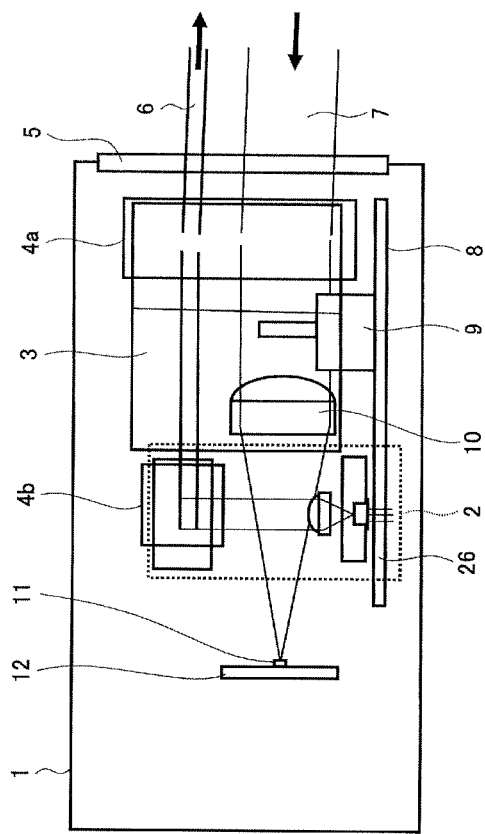
FIG. 18 shows a side view of the laser radar device according to the example.
Figure 19:
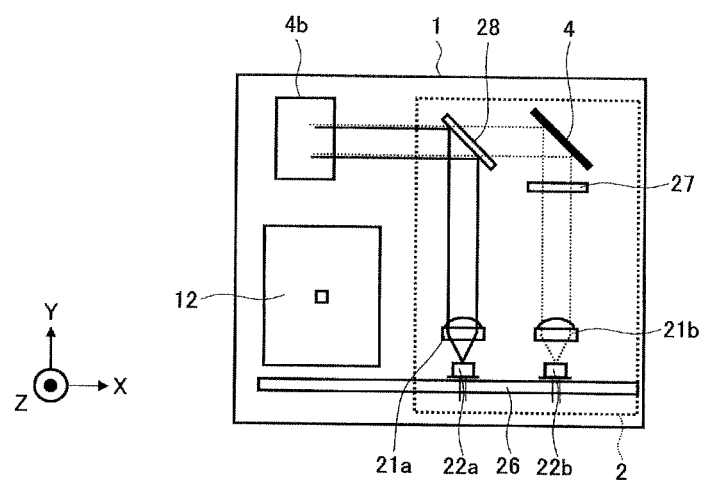
FIG. 19 shows the laser radar device according to the example, where the laser radar device is viewed from behind.

FIGS. 17, 18, and 19 shows an example of the laser radar device which adopts the beam synthesis. FIG. 17 is a diagram showing the laser radar device which is viewed from a top surface. FIG. 18 is a diagram showing the laser radar device which is viewed from a side surface. FIG. 19 is a diagram showing the laser radar device which is viewed from behind.

The two light sources 22a and 22b emit light beams from a bottom surface of the laser radar device in the Y-axis direction. The two light beams which are emitted from the two light sources 22a and 22b are synthesized by the half-wave plate 27 and the polarization beam splitter 28. The traveling direction of the synthesized light beam is changed to the minus X-axis direction. Subsequently, the light beam is guided to the polygon mirror 3 through corner mirrors 4a and 4b. Then, the light beam is emitted from the laser radar device as the light beam 6. The reflected signal 7 is guided to the receiving lens 10 through the polygon mirror 3 and the corner mirror 4a. Subsequently, the reflected signal 7 is coupled to the photodetector 11. By synthesizing the multiple light beams, increase in size of the optical system may be suppressed.

There are three types of circuits, which are the light source driving circuit 26, a photodetector driving circuit 12, and a motor driving circuit 8, as circuits that control the laser radar device. In addition, for example, there is a circuit that controls the whole laser radar device. However, it is assumed that one of the three types of driving circuits includes the overall control function. In order to produce the laser radar device with low cost, it is preferable that these driving circuits be integrated on a single substrate and formed together. In the configuration depicted in FIGS. 17, 18, and 19, the light source driving circuit 26 is formed on the substrate which is shared with the motor driving circuit 8. In this manner, the number of the electronic circuits is reduced, and the cost can be reduced.

EXAMPLE 5

Figure 20:
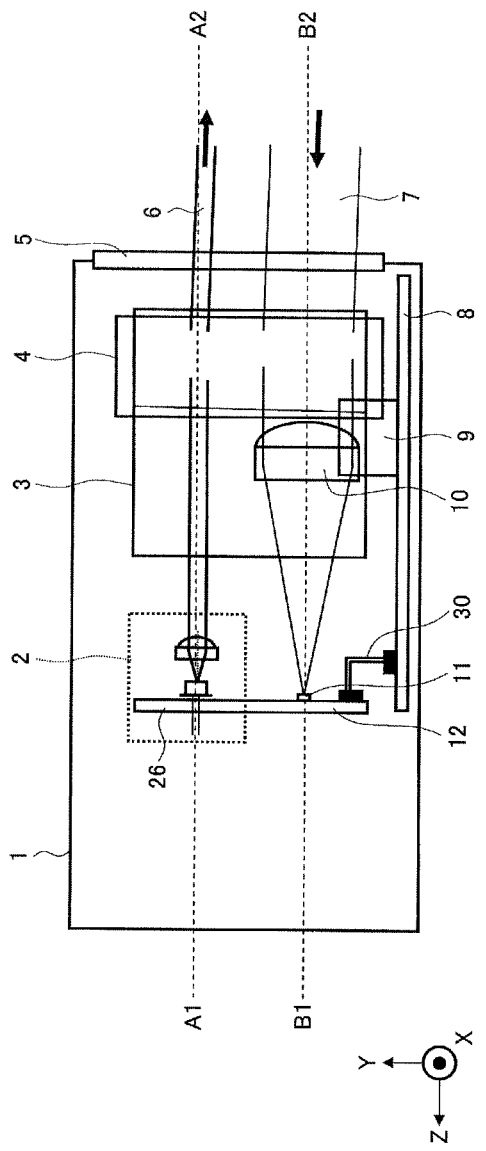
FIG. 20 shows a side view of the laser radar device according to one example.
Figure 21:
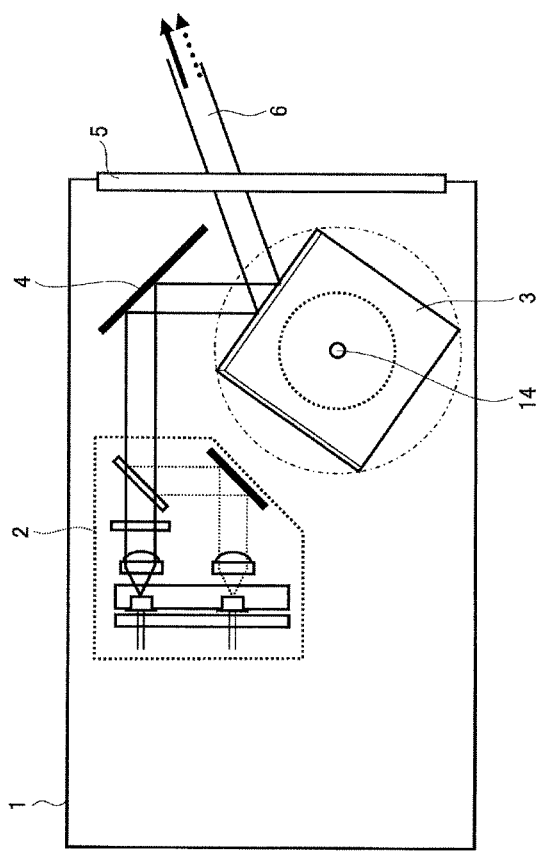
FIG. 21 shows a top view of the laser radar device according to the example.
Figure 22:
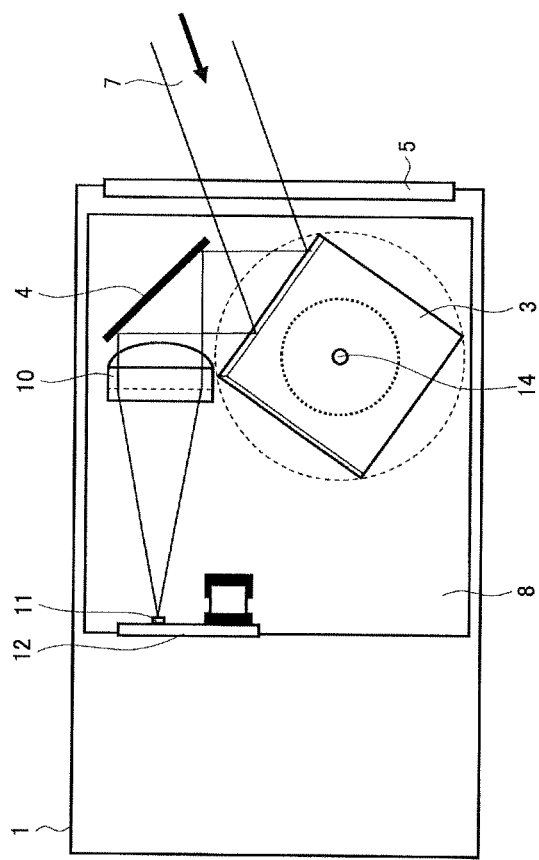
FIG. 22 shows a top view of the laser radar device according to the example.
Figure 23:
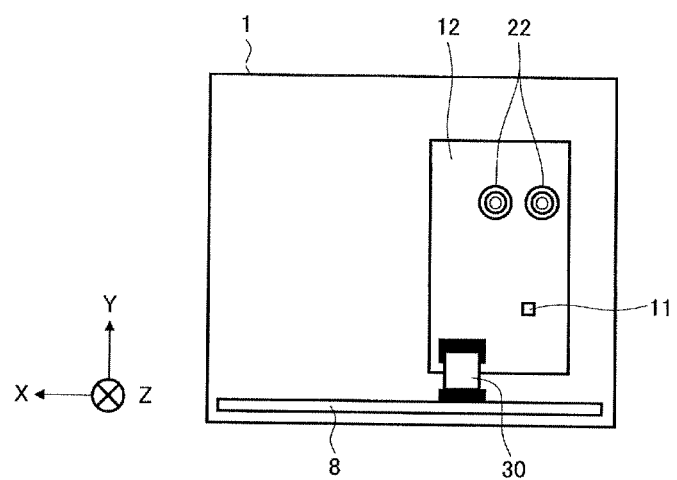
FIG. 23 shows a front view of the laser radar device according to the example.

FIGS. 20-23 depict another layout example of the laser radar device which adopts the beam synthesis. FIG. 20 is a configuration diagram showing the laser radar device, which is viewed from a side surface. FIG. 21 is a diagram showing the configuration of the laser radar device on the XZ-plane which includes the line A1A2. FIG. 22 is a diagram showing the configuration of the laser radar device on the XZ-plane which includes the line B1B2. Further, FIG. 23 is a diagram showing that the two light sources and the photodetector in the configuration are implemented on a common control board.

The configuration of the laser radar device shown in FIGS. 20-23 is the same as that of shown in FIGS. 17-19 in a point that the beam synthesis is performed by the half-wave plate and the polarization beam splitter which are disposed behind the polygon mirror 3, the synthesized light beam is guided to the polygon mirror through the corner mirror 4, and the light beam is scanned. The configuration of the laser radar device shown in FIGS. 20-23 is different from that of shown in FIGS. 17-19 in a point that, while in the configuration shown in FIGS. 17-19, the motor driving circuit 8 and the light source driving circuit 26 are implemented on the common substrate, in the configuration shown in FIGS. 20-23, the light source driving circuit 26 and the photodetector driving circuit 12 are formed on a common substrate as shown in FIG. 20, and the light sources 22 and the photodetector 1 are implemented on the common substrate. By such a configuration, the number of the substrates and the number of the electronic circuits can be reduced, and the cost can be reduced.

EXAMPLE 6

In the optical system according to the embodiment, the beam is scanned by inputting the light beams to the mirrors included in the polygon mirror 3 from a side, namely, the light beams are input on the XZ-plane. When the configuration is adopted such that the light beams enter the mirror from the side, in principle, the output angle in the vertical direction of the beam varies depending on the output angle in the horizontal direction of the beam. Namely, during the beam scanning, the detection area is deformed.

When the light beam perpendicularly enters the mirror having the tilt angle, the reflected light from the mirror is emitted, while the output angle in the vertical direction which is twice as much as the tilt angle is provided to the reflected light. When the mirror rotates and the light beam obliquely enters the rotated mirror, the output angle in the vertical direction is less than twice as much as the tilt angle. Namely, the variation of the output angle in the vertical direction is caused by providing the tilt angle to the mirror relative to the rotation axis of the motor. However, as the rotation angle of the mirror increases, the variation of the output angle in the vertical direction is reduced. Consequently, it is possible that an irradiation range of the light beam is reduced.

Figure 24:
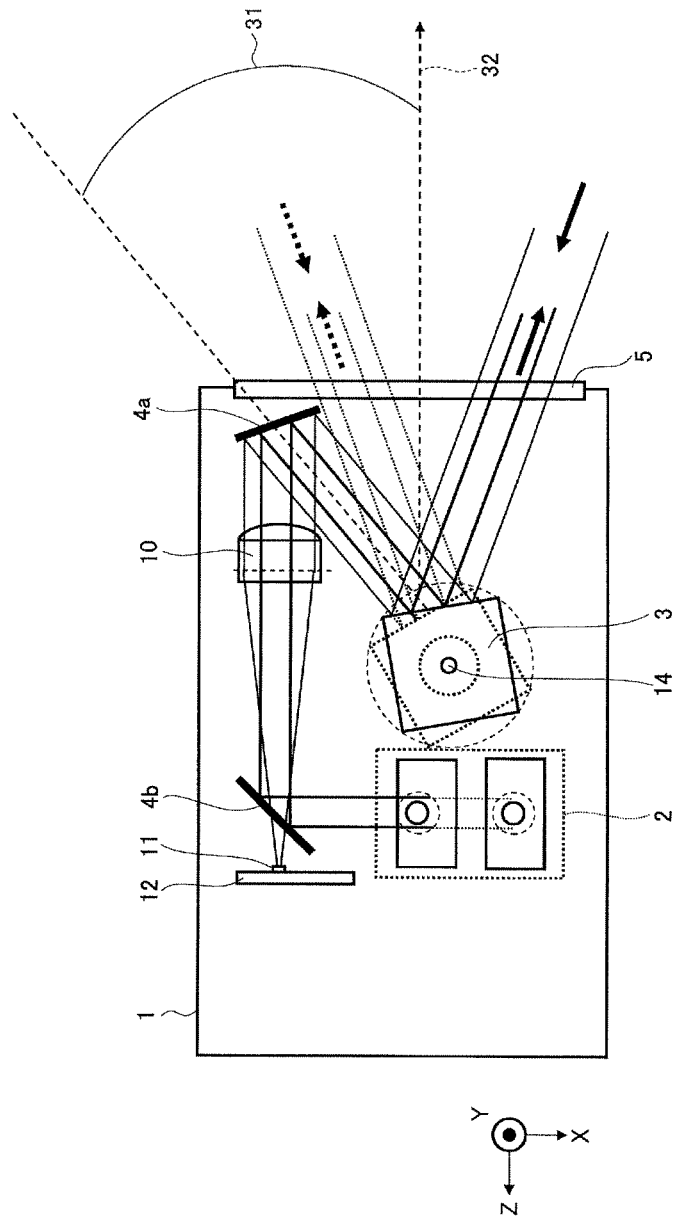
FIG. 24 shows a top view of the laser radar device according to one example.

FIG. 24 is a diagram illustrating a configuration example of the laser radar device which is effective for reducing the above-described problem. In the examples which are explained so far, the light beam enters the polygon mirror 3 in a direction which is in parallel with the X-axis, and the center of the beam scanning is a direction which is in parallel with the minus Z-axis. Namely, a difference between an incident direction of the light beam and a direction of the center of the scanning is set to be 90 degrees. In contrast, in FIG. 24, the difference between the incident direction of the light beam and the direction of the center of the scanning is set to be less than 90 degrees by adjusting an installation angle of the corner mirror 4a. With such a configuration, the light beam enters the polygon mirror 3 from a direction which is closer to the front direction. Accordingly, the output angle in the vertical direction of the light beam is prevented from being reduced, and the deformation of the detection range can be prevented.

Figure 25:
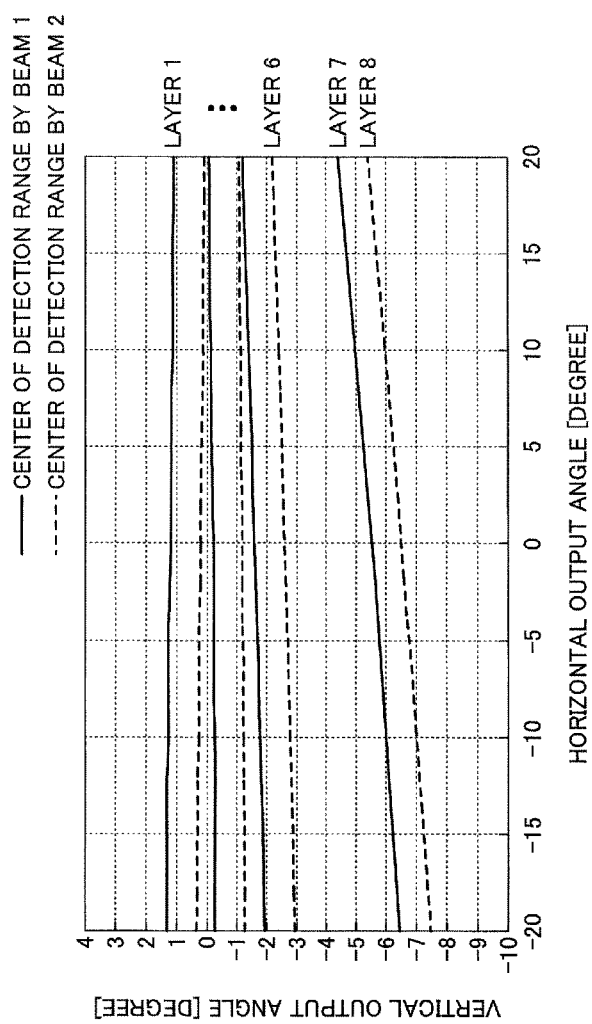
FIG. 25 represents a relationship between a horizontal output angle and a vertical output angle of the laser radar device according to one example of FIGS. 17-19.

FIG. 25 depicts a specific example of the detection range of a case of the configuration of FIG. 5 or the configuration of FIGS. 17-19, namely, the case where the difference between the incident direction of the light beam and the direction of the center of the scanning is set to be less than 90 degrees. The horizontal axis represents a detection angle in the horizontal direction, and the vertical axis represents a detection angle in the vertical direction. Further, the eight trajectories in the graph indicate trajectories of the center of the light beam that scans Layer 1 through Layer 8, respectively. As shown in FIG. 25, when the output angle in the horizontal direction is small, the eight layers are separated from each other. However, as the output angle in the horizontal direction increases, the trajectories of the light beam corresponding to different layers become closer. This can be a cause of the reduction of the detection range or a cause of erroneous detection between layers.

Figure 26:
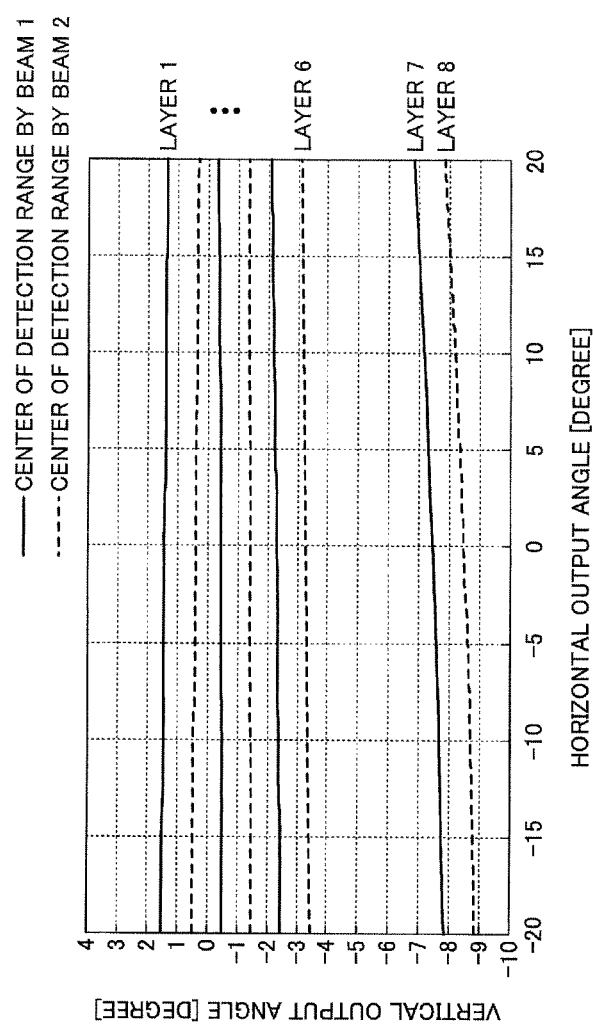
FIG. 26 represents a relationship between a horizontal output angle and a vertical output angle of the laser radar device according to the one example of FIG. 24.

FIG. 26 depicts the detection range when the difference between the incident direction of the light beam and the direction of the center of the scanning is set to be 40 degrees, as shown in FIG. 24. As the output angle in the horizontal direction increases, the beam is curved. However, the beam is not curved to the extent that the detection ranges of the neighboring layers overlap. Namely, the reduction of the detection area and erroneous detection between layers can be suppressed.

For the laser radar device according to the embodiment, the multiple light beams are utilized. However, the present invention is not limited to the embodiment. For example, for the laser radar device, a single light beam may be used.

EXAMPLE 7

Figure 27:
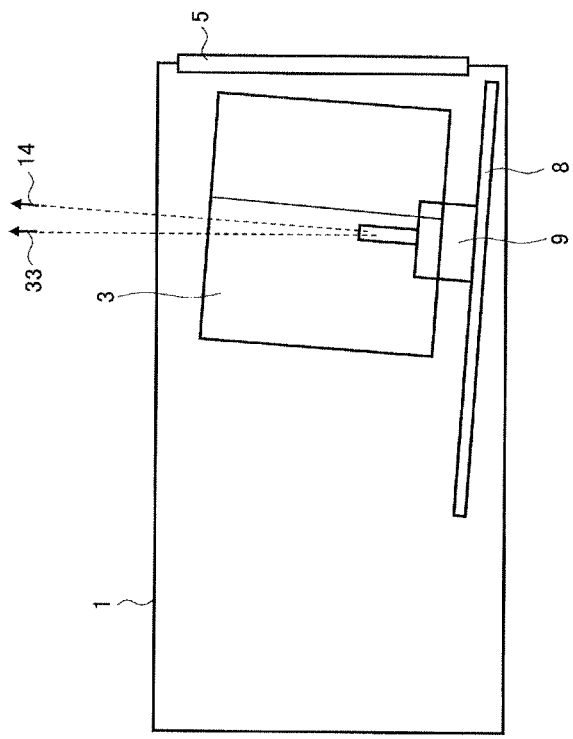
FIG. 27 shows a side view of the laser radar device according to one example.

FIG. 27 is a diagram illustrating another configuration example of the laser radar device. In the configuration examples so far, it is assumed that the rotation axis 14 of the motor 9 is in parallel with the Y-axis direction. However, the rotation axis 14 of the motor 9 is not limited to those of the configuration examples. For example, as shown in FIG. 27, it is effective to tilt the rotation axis 14 from the vertical direction toward the Z-axis direction.

Figure 28:
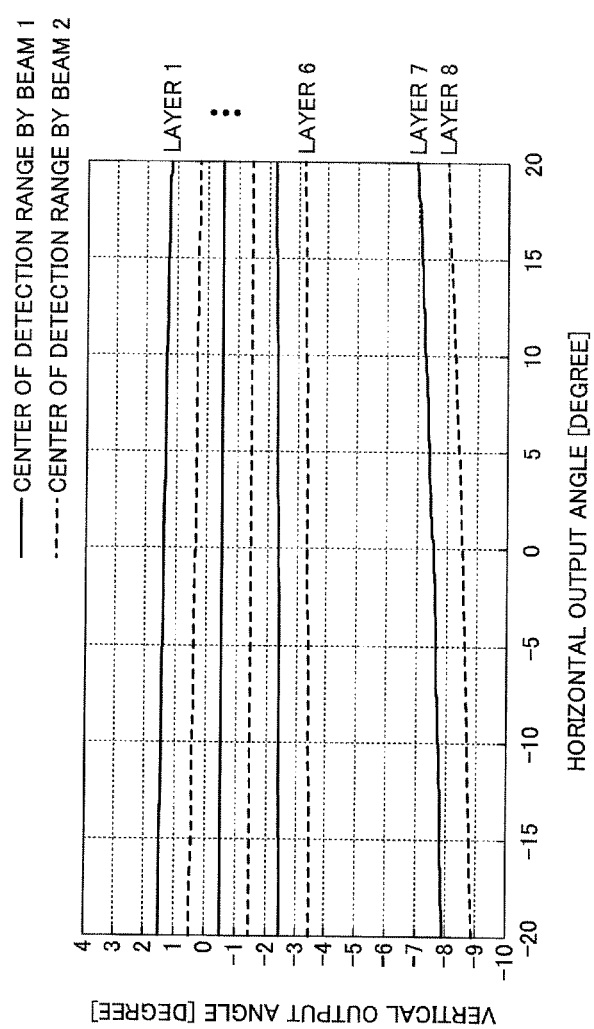
FIG. 28 represents a relationship between a horizontal output angle and a vertical output angle of the laser radar device of FIG. 27.

FIG. 26 depicts the detection range when the rotation axis 14 of the motor 9 is in parallel with the Y-axis direction. FIG. 28 depicts the detection range when the rotation axis 14 of the motor 9 is tilted from the Y-axis direction toward the minus Z-axis side, namely, when the rotation axis 14 of the motor 9 is tilted toward the window side of the laser radar device by 1 degree. When the rotation axis 14 of the motor 9 is in parallel with the Y-axis direction, in principle, the light beam is not curved if the output angle in the vertical direction is 0 degrees. However, as the output angle in the vertical direction deviates from 0 degrees, the curve becomes more severe. For Layer 2 and Layer 3, almost no curves are observed. However, for Layer 5 and Layer 6, the amount of the curve is increased.

In the example of the detection range which is shown in FIG. 12, it is assumed that, for the range from Layer 1 to Layer 6, the center of the output angle in the vertical direction of the light beam is minus one degree. Thus, by tilting the rotation axis 14 of the motor 9 by one degree, it is possible to prevent the curves from occurring when the output angle in the vertical direction of the light beam is minus one degree, as shown in FIG. 28. Consequently, it is possible to reduce the differences of the amounts of the curves among the layers.

In this configuration example, the rotation axis 14 of the motor 9 is tilted from the vertical direction 33. However, the embodiment of the present invention is not limited to this configuration example, provided that another configuration has the same effect. For example, while the direction of the rotation axis 14 of the motor 9 is left in the vertical direction 33, an incident angle of the light beam with respect to the polygon mirror 3 may be tilted in the Y-axis direction.

For the laser radar device according to the embodiment, the multiple light beams are utilized. However, the present invention is not limited to the embodiment. For example, for the laser radar device, a single light beam may be used.

EXAMPLE 8

Figure 29:
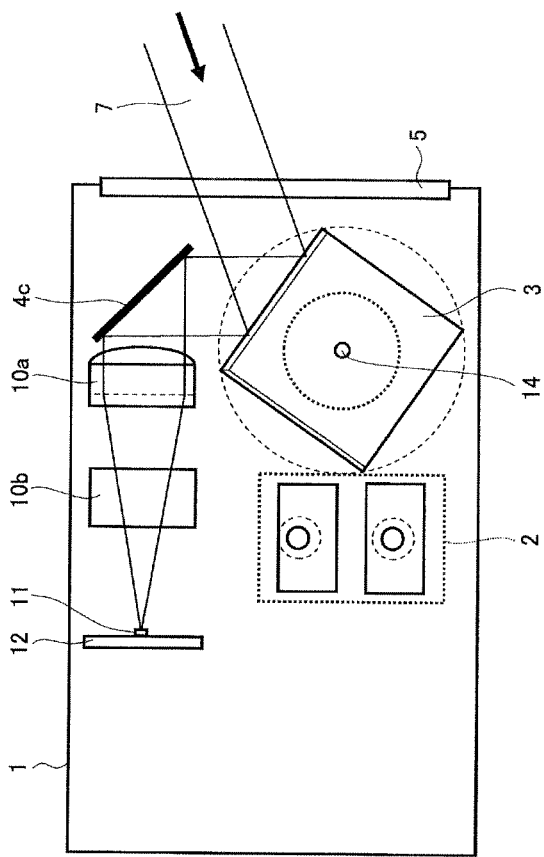
FIG. 29 shows a top view of the laser radar device according to one example.
Figure 30:
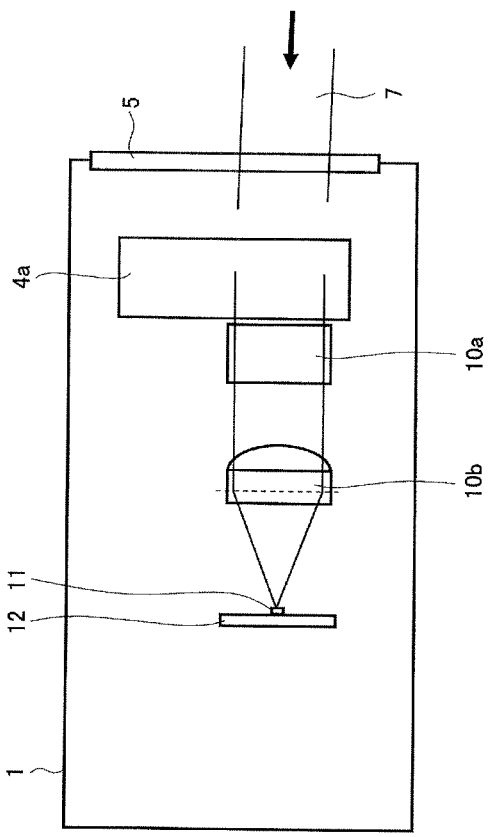
FIG. 30 shows a side view of the laser radar device according to the one example.

FIG. 29 shows another example of the receiving lens 10 of the laser radar device. The receiving lens 10 includes a cylindrical lens 10a and a cylindrical lens 10b. FIG. 30 is a side view of a receiving optical system which is included in the laser radar device according to the embodiment. In the configuration examples so far, the reflected light is condensed by the single receiving lens 10, and the reflected light is guided to the photodetector 11. In contrast, in this configuration example, the two cylindrical lenses 10a and 10b, whose focal lengths are different from each other, are arranged in series. With this configuration, the light in the horizontal direction (the X-axis direction) and the light in the vertical direction (the Y-axis direction) are condensed by corresponding different lenses.

For a typical laser radar device, the space angle resolution is such that, in the horizontal direction, the angular resolution is approximately 0.1 degrees, and in the vertical direction, the angular resolution is approximately 1.0 degree. For the case of the embodiment, it is necessary to receive all the light beams, whose output angles in the vertical direction are different. For example, when the number of the beams is two, it may be necessary to cover the angular range of 2.0 degrees in the vertical direction.

It may be required that the receiving optical system is able to completely receive the reflected light from the horizontal and vertical angular ranges, which are defined in this manner. At the same time, in order to prevent receiving stray light and background light, it may be necessary to avoid setting the receiving angle to be too wide. The range of the receiving angle is determined by the size of the photodetector 11 and the focal length of the receiving lens 10.

For example, when the size of the photodetector 11 is such that 0.06 mm in the horizontal direction, and 1.2 mm in the vertical direction, and when the focal length of the receiving lens 10 is 35 mm, the range of the receiving angle is such that 0.1 degrees in the horizontal direction, and 2.0 degrees in the vertical direction. In order to obtain the photodetector 11 having the above-described size, a shape of a light receiving area may be defined to be a rectangular shape of 0.06 mm×1.2 mm. Alternatively, a shading mask having a transparent region, which has the above-described rectangular shape, may be attached to the photodetector 11 having a wider light receiving area.

When the receiving lens 10 is formed by a single coaxial lens, the size in the horizontal direction of the photodetector 11 is small, such as several tens of micrometers. In manufacturing the photodetector 11, dimensional accuracy is strictly required. Further, when the position of the receiving lens 10 is shifted, the variation of the condensing position significantly affects an amount of the received light.

The configuration which is shown in FIGS. 29 and 30 condenses the horizontal directional component and the vertical directional component of the reflected light by the corresponding cylindrical lenses having different focal lengths. Thus, by setting the focal length of the receiving lens 10a, which condenses the horizontal directional component, to be greater than that of the receiving lens 10b, which condenses the vertical directional component, the effect of the positional shift during the lens position adjustment can be reduced. For example, when the focal length of the receiving lens 10a is 70 mm, and when the focal length of the receiving lens 10b is 35 mm, the size of the photodetector 11, which is required to achieve the range of receiving angle such that 0.1 degrees in the horizontal direction and 2.0 degrees in the vertical direction, is that 0.12 mm in the horizontal direction, and 1.2 mm in the vertical direction. With this size, it is easier to manufacture the photodetector 11.

As described above, when the receiving lens 10 is formed of the two cylindrical lenses 10a and 10b, the requirement on manufacturing tolerance of the dimensions of the element is mitigated. Thus, the robustness can be improved against the shift of the optical axis, which may be caused during the adjustment or which may be caused by variation in temperature. Further, in this example, the receiving lens 10 includes two cylindrical lenses 10a and 10b. However, the configuration of the receiving lens 10 is not limited to this example. For example, the receiving lens 10 may be a single lens such that a cylindrical surface that contributes to condense the horizontal directional component is formed on a front surface, and a cylindrical surface that contributes to condense the vertical directional component is formed on a rear surface.

Hereinabove, the laser radar device is explained by the embodiment. However, the present invention is not limited to the above-described embodiment, and variations and modifications may be made within the scope of the present invention.

The present application is based on and claims the benefit of priority of Japanese Priority Application No. 2012-149648, filed on Jul. 3, 2012, and Japanese Priority Application No. 2012-261644, filed on Nov. 29, 2012, the entire contents of which are hereby incorporated herein by reference.

What is claimed is:

1. A laser radar device comprising:
   a modulated light beam generator including plural light-emitting elements to emit light beams to a detection target, each light-emitting element including a light source configured to output light in a vertical direction and a coupling lens disposed to receive the light output by the light source in the vertical direction and condense the received light into a light beam of a corresponding emission angle relative to the vertical direction;
   a photodetector configured to receive reflected light which is reflected by the detection target, when the light beams emitted by the modulated light beam generator irradiate the detection target;
   a reflected light condenser configured to condense the reflected light and configured to guide the reflected light to the photodetector;
   a rotator configured to rotate around a rotation axis; and
   mirrors configured to scan the light beams in a horizontal direction, and configured to guide the reflected light to the reflected light condenser, the mirrors being included in the rotator;
   wherein the vertical direction of the light output by the light source, the horizontal direction in which the light beams are scanned by the mirrors, and the rotation axis of the rotator are mutually perpendicular to each other;
   wherein an angular detection range in the vertical direction relative to a direction in which the light beams are emitted is divided into a plurality of layers,
   wherein the mirrors include corresponding mirror surfaces,
   wherein the mirror surfaces are tilted by corresponding tilt angles relative to the rotation axis, the tilt angles being different from each other,
   wherein the modulated light beam generator emits two or more light beams having respective different emission angles relative to the vertical direction, and
   wherein a difference between the emission angles corresponds to the angular detection range of one layer in the vertical direction, and
   wherein the light beams are reflected by the mirrors prior to irradiating the detection target, and the reflected light is reflected by the mirrors prior to being received by the photodetector.

2. The laser radar device according to claim 1, wherein emission timings of the light beams are different from each other.

3. The laser radar device according to claim 2, wherein the modulated light beam generator includes a plurality of laser light sources, wherein the laser light sources alternately generate pulsed laser light beams.

4. The laser radar device according to claim 1, wherein the modulated light beam generator includes a half-wave plate and a polarization beam splitter.

5. The laser radar device according to claim 1, wherein a difference between the emission angle in the horizontal direction of the light beams corresponding to a center direction of the scanning by one of the mirrors and an incident angle of the corresponding light beams entering from the modulated light beam generator to the one of the mirrors is less than 90 degrees.

6. The laser radar device according to claim 1, wherein the rotation axis of the rotator is tilted from the vertical direction.

7. The laser radar device according to claim 1, wherein the reflected light condenser includes a plurality of cylindrical lenses.

8. The laser radar device according to claim 1, wherein the light source included in the modulated light beam generator and a control circuit configured to control the rotator are implemented on a common substrate.

9. The laser radar device according to claim 1, wherein the light source included in the modulated light beam generator and the photodetector are implemented on a common control board.

10. The laser radar device according to claim 1, further comprising:
   a polygon mirror including the rotator and the plural mirrors,
   an additional mirror disposed in a light path of the light beams emitted by the modulated light beam generator, to deflect said light beams towards the polygon mirror, in a deflection direction forming a deflection angle relative to an emission direction of the light beams emitted by the modulated light beam generator,
   wherein the modulated light beam generator, the additional mirror and the polygon mirror are disposed relative to each other such that the deflection angle between the deflection direction of the deflected light beams and the emission direction of the light beams emitted by the modulated light beam generator is less than 90 degrees, and
   wherein the light beams are reflected by the mirrors prior to irradiating the detection target, and the reflected light is reflected by the mirrors prior to being received by the photodetector.

11. A laser radar device comprising:
   a modulated light beam generator including plural light-emitting elements to emit light beams to a detection target each light-emitting element including a light source configured to output light in a vertical direction and a coupling lens disposed to receive the light output by the light source in the vertical direction and condense the received light into a light beam of a corresponding emission angle relative to the vertical direction;
   a photodetector configured to receive reflected light which is reflected by the detection target, when the light beams emitted by the modulated light beam generator irradiate the detection target;
   a reflected light condenser configured to condense the reflected light and configured to guide the reflected light to the photodetector; and
   a polygon mirror including:
      a rotator configured to rotate around a rotation axis; and
      plural mirrors configured to scan the light beams in a horizontal direction, and configured to guide the reflected light to the reflected light condenser,
   wherein the vertical direction of the light output by the light source, the horizontal direction in which the light beams are scanned by the mirrors, and the rotation axis of the rotator are mutually perpendicular to each other;
   wherein the rotation axis of the polygon mirror rotated around the rotator is tilted from the vertical direction thereby preventing curvature of the light beams from occurring when the output angle in the vertical direction of the light beams deviates from zero degrees, and
   wherein the light beams are reflected by the polygon mirror prior to irradiating the detection target, and the reflected light is reflected by the polygon mirror prior to being received by the photodetector.

* * * * *